United States Patent
Choi et al.

(10) Patent No.: US 8,712,958 B2
(45) Date of Patent: *Apr. 29, 2014

(54) METHOD AND APPARATUS FOR REPRESENTING SENSORY EFFECTS AND COMPUTER READABLE RECORDING MEDIUM STORING USER SENSORY PREFERENCE METADATA

(75) Inventors: Bum-Suk Choi, Daejon (KR);
Sanghyun Joo, Daejon (KR);
Hae-Ryong Lee, Daejon (KR);
Seungsoon Park, Seoul (KR);
Kwang-Roh Park, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/054,660

(22) PCT Filed: Jul. 16, 2009

(86) PCT No.: PCT/KR2009/003944
§ 371 (c)(1),
(2), (4) Date: Jan. 18, 2011

(87) PCT Pub. No.: WO2010/008233
PCT Pub. Date: Jan. 21, 2010

(65) Prior Publication Data
US 2011/0125787 A1      May 26, 2011

Related U.S. Application Data

(60) Provisional application No. 61/081,361, filed on Jul. 16, 2008.

(51) Int. Cl.
*G06F 7/00* (2006.01)
*G06F 17/00* (2006.01)

(52) U.S. Cl.
USPC .......................................................... 707/612

(58) Field of Classification Search
USPC .......................... 707/614, 694, 784, 999.002
See application file for complete search history.

(56) References Cited

U.S. PATENT DOCUMENTS

| | | | |
|---|---|---|---|
| 6,466,232 B1 * | 10/2002 | Newell et al. | 715/700 |
| 2004/0003073 A1 | 1/2004 | Krzyzanowski et al. | |
| 2004/0188511 A1 | 9/2004 | Sprigg et al. | |
| 2005/0021866 A1 | 1/2005 | Kang et al. | |
| 2006/0230183 A1 | 10/2006 | Zhu et al. | |
| 2008/0046944 A1 | 2/2008 | Lee et al. | |

FOREIGN PATENT DOCUMENTS

| | | |
|---|---|---|
| JP | 2004-135789 | 5/2004 |
| KR | 10-2005-0005653 | 1/2005 |
| KR | 10-2009-0061516 | 6/2009 |
| KR | 10-2009-0065355 | 6/2009 |

OTHER PUBLICATIONS

International Search Report for PCT/KR2009/003944 mailed Mar. 3, 2010.

* cited by examiner

*Primary Examiner* — Alexey Shmatov
(74) *Attorney, Agent, or Firm* — Staas & Halsey LLP

(57) ABSTRACT

Provided are method and apparatus for representing sensory effects, and a computer readable recording medium storing user sensory preference metadata. A method for providing user preference information includes: receiving preference information for predetermined sensory effects from a user; and generating user sensory preference metadata including the received preference information, wherein the user sensory preference metadata includes personal preference information that describes the preference information.

9 Claims, 8 Drawing Sheets

METHOD AND APPARATUS FOR REPRESENTING SENSORY EFFECTS AND COMPUTER READABLE RECORDING MEDIUM STORING USER SENSORY PREFERENCE METADATA

CROSS REFERENCE TO RELATED APPLICATIONS

This application claims the benefit under 35 U.S.C. Section 371, of PCT International Application No. PCT/KR2009/003944, filed Jul. 16, 2009, which claimed priority to U.S. Application No. 61/081,361, filed Jul. 16, 2008, in the United States Patent & Trademark Office, the disclosures of which are hereby incorporated by reference.

TECHNICAL FIELD

The present invention relates to a method and apparatus for representing sensory effects, and a computer readable recording medium storing user sensory preference metadata.

BACKGROUND ART

In general, media includes audio and video. The audio may be voice or sound and the video may be a still image and a moving image. When a user consumes or reproduces media, a user uses metadata to obtain information about media. Here, the metadata is data about media. Meanwhile, a device for reproducing media has been advanced from devices reproducing media recorded in an analog format to devices reproducing media recorded in a digital format.

An audio output device such as speakers and a video output device such as a display device have been used to reproduce media.

FIG. 1 is a diagram for schematically describing a media technology according to the related art. As shown in FIG. 1, media is outputted to a user using a media reproducing device 104. The media reproducing device 104 according to the related art include only devices for outputting audio and video. Such a conventional service is referred as a single media single device (SMSD) based service in which one media is reproduced through one device.

Meanwhile, audio and video technologies have been advanced to effectively provide media to a user. For example, an audio technology has been developed to process an audio signal to a multi-channel signal or a multi-object signal or a display technology also has been advanced to process video to a high quality video, a stereoscopic video, and a three dimensional image.

Related to a media technology, a moving picture experts group (MPEG) has introduced MPEG-1, MPEG-2, MPEG-4, MPEG-7 and MPEG-21 and has developed new media concept and multimedia processing technology. MPEG-1 defines a formation for storing audio and video and MPEG-2 defines specification about audio transmission. MPEG-4 defines an object-based media structure. MPEG-7 defines specification about metadata related to media, and MPEG-21 defines media distribution framework technology.

Although realistic experiences can be provided to a user through 3-D audio/video devices due to the development of the media technology, it is very difficult to realize sensory effects only with audio/video devices and media.

DISCLOSURE

Technical Problem

An embodiment of the present invention is directed to providing a method and apparatus for representing sensory effects in order to maximize media reproducing effects by realizing sensory effects when media is reproduced.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for providing user preference information comprising: receiving preference information for predetermined sensory effects from a user; and generating user sensory preference metadata including the received preference information, wherein the user sensory preference metadata includes personal preference information that describes the preference information.

In accordance with another aspect of the present invention, there is provided an apparatus for providing user preference information, comprising: an input unit configured to receive preference information of predetermined sensory effects from a user; and a controlling unit configured to generate user sensory preference metadata including the received preference information, wherein the user sensory preference metadata include personal preference information that describes the preference information.

In accordance with another aspect of the present invention, there is provided a method for representing sensory effects, comprising: receiving sensory effect metadata including sensory effect information about sensory effects applied to media; obtaining the sensory effect information by analyzing the sensory effect metadata; receiving user sensory preference metadata including preference information about predetermined sensory effects; and generating sensory device command metadata for controlling sensory devices corresponding to the sensory effect information by referring to the preference information included in the user sensory preference metadata, wherein the user sensory preference metadata includes personal preference information that describes the preference information.

In accordance with another aspect of the present invention, there is provided an apparatus for representing sensory effects comprising: an input unit configured to receive sensory effect metadata including sensory effect information about sensory effects applied to media and user sensory preference metadata including preference information of a user about predetermined sensory effects; and a controlling unit configured to obtain the sensory effect information by analyzing the sensory effect metadata and generating sensory device command metadata for controlling sensory devices corresponding to the sensory effect information by referring to the preference information included in the user sensory preference metadata, wherein the user sensory preference metadata includes personal preference information that describes the preference information.

In accordance with another aspect of the present invention, there is provided a computer readable recording medium storing metadata, the metadata comprising: user sensory preference metadata including preference information about predetermined sensory effects, wherein the user sensory preference metadata includes personal preference information that describes the preference information.

Advantageous Effects

A method and apparatus for reproducing sensory effects can maximize media reproducing effects by realizing sensory effects when media is reproduced.

BEST MODE FOR THE INVENTION

Figure 1:
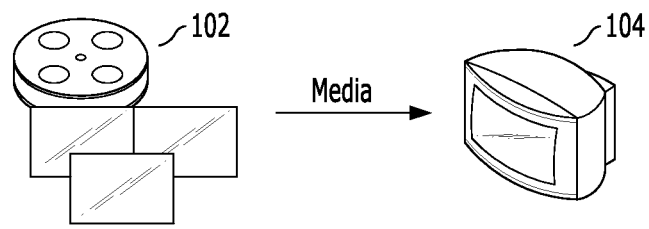
FIG. 1 is a schematic diagram illustrating a media technology according to the related art.

The advantages, features and aspects of the invention will become apparent from the following description of the embodiments with reference to the accompanying drawings, which is set forth hereinafter. In addition, if further detailed description on the related prior arts is determined to obscure the point of the present invention, the description is omitted. Hereafter, preferred embodiments of the present invention will be described in detail with reference to the drawings. The same reference numeral is given to the same element, although the element appears in different drawings.

Conventionally, audio and video are only objects of media generation and consumption such as reproducing. However, human has not only visual and auditory senses but also olfactory and tactile senses. Lately, many studies have been made to develop a device stimulating all of the five senses of human.

Meanwhile, home appliances controlled by an analog signal have been advanced to home appliances controlled by a digital signal.

Media has been limited as audio and video only. The concept of media limited as audio and video may be expanded by controlling devices that stimulate other senses such as olfactory or tactile sense with media incorporated. That is, a media service has been a single media single device (SMSD) based service in which one media is reproduced by one device. However, in order to maximize media reproducing effect in ubiquitous home, a single media multi devices (SMMD) based service may be realized. The SMMD based service reproduces one media through multiple devices.

Therefore, it is necessary to advance a media technology for reproducing media to simply watch and listen to a sensory effect type media technology for representing sensory effects with media reproduced in order to satisfy five senses of human. Such a sensory effect type media may extend a media industry and a market of sensory effect devices and provide rich experience to a user by maximizing media reproducing effect. Therefore, a sensory effect type media may promote the consumption of media.

Figure 2:
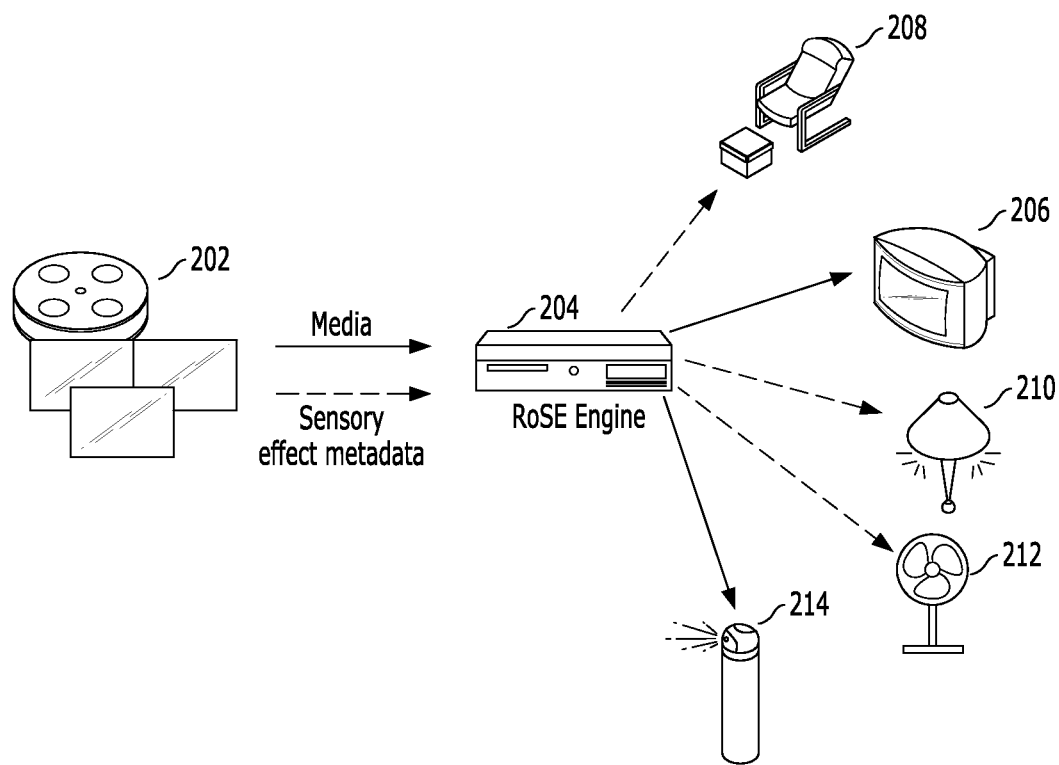
FIG. 2 is a conceptual diagram illustrating realizing sensor effect media in accordance with an embodiment of the present invention.

FIG. 2 is a diagram illustrating realization of sensory effect media in accordance with an embodiment of the present invention.

Referring to FIG. 2, media 202 and sensory effect metadata are input to an apparatus for representing sensory effects. Here, the apparatus for representing sensory effects is also referred as a representation of sensory effect engine (RoSE Engine) 204. Here, the media 202 and the sensory effect metadata may be input to the representation of sensory effect engine (RoSE Engine) 204 by independent providers. For example, a media provider (not shown) may provide media 202 and a sensory effect provider (not shown) may provide the sensory effects metadata.

The media 202 includes audio and video, and the sensory effect metadata includes sensory effect information for representing or realizing sensory effects of media 202. The sensory effect metadata may include all information for maximizing reproducing effects of media 202. FIG. 2 exemplary shows visual sense, olfactory sense, and tactile sense as sensory effects. Therefore, sensory effect information includes visual sense effect information, olfactory sense effect information, and tactile sense effect information.

The RoSE engine 204 receives media 202 and controls a media output device 206 to reproduce the media 202. The RoSE engine 204 controls sensory effect devices 208, 210, 212, and 214 using visual effect information, olfactory effect information, and tactile effect information included in sensory effect metadata. Particularly, the RoSE engine 204 controls lights 210 using the visual effect information, controls a scent device 214 using the olfactory effect information, and controls a trembling chair 208 and a fan 212 using the tactile effect information.

For example, when video including a scene of lightning or thunder is reproduced, lights 210 are controlled to be turned on and off. When video including a scene of foods or a field is reproduced, the scent device 214 is controlled. Further, when video including a scene of water rafting or car chasing is reproduced, the trembling chair 208 and the fan 212 are controlled. Accordingly, sensory effects can be realized corresponding to scenes of video while reproducing.

In order to realize sensory effects, it is necessary to define a schema to express sensory effect information such as intensity of wind, color of light, and intensity of vibration in a standard format. Such a standardized schema for sensory effect information is referred as sensory effect metadata (SEM). When the sensory effect metadata is input to the RoSE engine 204 with the media 202, the RoSE engine 204 analyzes the sensory effect metadata that is described to realize sensory effects at predetermined times while reproducing the media 202. Further, the RoSE engine 204 controls sensory effect devices with being synchronized with the media 202.

The RoSE engine 204 needs to have information about various sensory devices in advance for representing sensory effects. Therefore, it is necessary to define metadata for expressing information about sensory effect devices. Such metadata is referred to as a sensory device capability metadata (SDCap). The sensory device capability metadata includes information about positions, directions, and capabilities of sensory devices.

A user who wants to reproduce media 202 may have various preferences for specific sensory effects. Such a preference may influence representation of sensory effects. For example, a user may not like a red color light. Or, when a user wants to reproduce media 202 in the middle of night, the user may want a dim lighting and a low sound volume. By expressing such preferences of a user about predetermined sensory effects as metadata, various sensory effects may be provided to a user. Such metadata is referred to as user sensory preference metadata (USP).

Before representing sensory effects, the RoSE engine 204 receives sensory effect capability metadata from each of sensory effect devices and user sensory preference metadata through an input device or from sensory effect devices. The RoSE engine 204 controls sensory effect devices with reference to the sensory effect capability metadata and the user sensory preference metadata USP. Such a control command is transferred to each of the sensory devices in a form of metadata. The metadata is referred to as a sensory device command metadata (SDCmd).

Hereinafter, a method and apparatus for representing sensory effects in accordance with an embodiment of the present invention will be described in detail.

DEFINITIONS OF TERMS

1. Provider

The provider is an object that provides sensory effect metadata. The provider may also provide media related to the sensory effect metadata.

For example, the provider may be a broadcasting service provider

2. Representation of Sensory Effect (RoSE) Engine

The RoSE engine is an object that receives sensory effect metadata, sensory device capabilities metadata, user sensory preference metadata, and generates sensory device commands metadata based on the received metadata.

3. Consumer Devices

The consumer device is an object that receives sensory device command metadata and provides sensory device capabilities metadata. Also, the consumer device may be an object that provides user sensory preference metadata. The sensory devices are a sub-set of the consumer devices.

For example, the consumer device may be fans, lights, scent devices, and human input devices such as a television set with a remote controller.

4. Sensory Effects

The sensory effects are effects that augment perception by stimulating senses of human at a predetermined scene of multimedia application.

For example, the sensory effects may be smell, wind, and light.

5. Sensory Effect Metadata (SEM)

The sensory effect metadata (SEM) defines description schemes and descriptors for representing sensory effects 6. Sensory Effect Delivery Format The sensory effect delivery format defines means for transmitting the sensory effect metadata (SEM).

For example, the sensory effect delivery format may be a MPEG2-TS payload format, a file format, and a RTP payload format.

7. Sensory Devices

The sensory devices are consumer devices for producing corresponding sensory effects.

For example, the sensory devices may be light, fans, and heater.

8. Sensory Device Capability

The sensory device capability defines description schemes and descriptors for representing properties of sensory devices.

For example, the sensory device capability may be a extensible markup language (XML) schema.

9. Sensory Device Capability Delivery Format

The sensory device capability delivery format defines means for transmitting sensory device capability.

For example, the sensory device capability delivery format may be hypertext transfer protocol (HTTP), and universal plug and play (UPnP).

10. Sensory Device Command

The sensory device command defines description schemes and descriptors for controlling sensory devices.

For example, the sensory device command may be a XML schema.

11. Sensory Device Command Delivery Format

The sensory device command delivery format defines means for transmitting the sensory device command.

For example, the sensory device command delivery format may be HTTP and UPnP.

12. User Sensory Preference

The user sensory preference defines description schemes and descriptors for representing user preferences about sensory effects related to rendering sensory effects.

For example, the user sensory preference may be a XML schema.

13. User Sensory Preference Delivery Format

The user sensory preference delivery format defines means for transmitting user sensory preference.

For example, the user sensory preference delivery format may be HTTP and UPnP.

<System for Representing Sensory Effects>

Hereinafter, an overall structure and operation of a system for representing sensory effects in accordance with an embodiment of the present invention will be described in detail.

Figure 3:
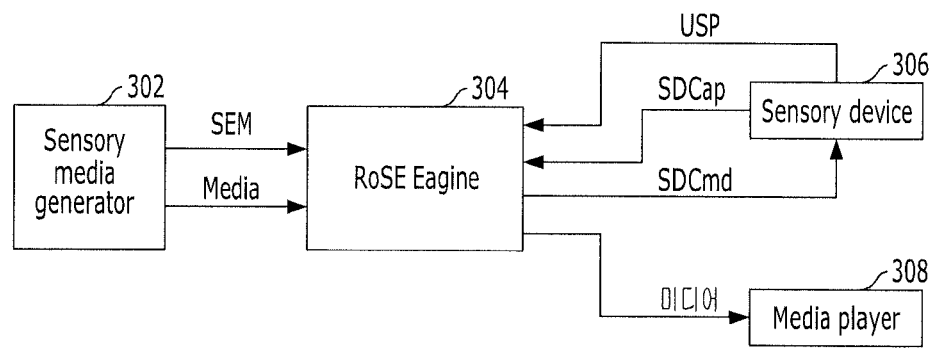
FIG. 3 is a diagram illustrating a single media multiple device (SMMD) system for representing sensory effects in accordance with an embodiment of the present invention.

FIG. 3 is a diagram illustrating a single media multiple device (SMMD) system for representing sensory effects in accordance with an embodiment of the present invention.

Referring to FIG. 3, the SMMD system according to the present embodiment includes a sensory media generator 302, a representation of sensory effects (RoSE) engine 304, a sensory device 306, and a media player 308.

The sensory media generator 302 receives sensory effect information about sensory effects applied to media and generates sensory effect metadata (SEM) including the received sensory effect information. Then, the sensory media generator 302 transmits the generated sensory effect metadata to the RoSE engine 304. Here, the sensory media generator 302 may transmit media with the sensory effect metadata.

Although it is not shown in FIG. 3, a sensory media generator 302 according to another embodiment may transmit only sensory effect metadata. Media may be transmitted to the RoSE engine 304 or the media player 308 through additional devices. The sensory media generator 302 generates sensory media by packaging the generated sensory effect metadata with the media and may transmit the generated sensory media to the RoSE engine 304.

The RoSE engine 304 receives sensory effect metadata including sensory effect information about sensory effects applied to media and obtains sensory effect information by analyzing the received sensory effect metadata. The RoSE engine 304 controls the sensory device 306 of a user in order to represent sensory effects while reproducing media using the obtained sensory effect information. In order to control the sensory devices 306, the RoSE engine 304 generate the sensory device command metadata (SDCmd) and transmits the generated sensory device command metadata to the sensory device 306. In FIG. 3, one sensory device 306 is shown for convenience. However, a user may possess a plurality of sensory devices.

In order to generate the sensory device command metadata, the RoSE engine 304 needs information about capabilities of each sensory device 306. Therefore, before generating the sensory device command metadata, the RoSE engine 304 receives sensory device capability metadata (SDCap) that includes the information about capabilities of sensory devices 306. The RoSE engine 304 obtains information about states and capabilities of each sensory device 306 from the sensory device capability metadata. The RoSE engine 304 generates sensory device command metadata for realizing sensory effects that can be realized by each of sensory devices using the obtained information. Here, the controlling the sensory devices include synchronizing the sensory devices with scenes that are reproduced by the media player 308.

In order to control the sensory device 306, the RoSE engine 304 and the sensory device 306 may be connected through networks. Particularly, LonWorks or Universal Plug and Play technologies may be applied as the network technology. In order to effective provide media, media technologies such as MPEG including MPEG-7 and MPEG-21 may be applied together.

A user of the sensory device 306 and the media player 308 may have various preferences about predetermined sensory effects. For example, the user may dislike a predetermined color or may want strong vibration. Such user preference information may be input through the sensory device 306 or an additional input terminal (not shown). Further, the user preference information may be generated in a form of metadata. Such metadata is referred to as user sensory preference metadata USP. The generated user sensory preference metadata is transmitted to the RoSE engine 304 through the sensory device 306 or the input terminal (not shown). The RoSE engine 304 may generate sensory device command metadata in consideration of the received user sensory preference metadata.

The sensory device 306 is a device for realizing sensory effects applied to media. Particularly, the sensory device 306 includes exemplary devices as follows. However, the present invention is not limited thereto.
  visual device: monitor, TV, wall screen.
  sound device: speaker, music instrument, and bell
  wind device: fan, and wind injector.
  temperature device: heater and cooler
  Lighting device: light, dimmer, color LED, and flash
  shading device: curtain, roll screen, and door
  vibration device: trembling chair, joy stick, and ticker
  scent device: perfumer
  diffusion device: sprayer
    other device: devices that produce undefined effects and combination of the above devices A user may have more than one of sensory devices 306. The sensory devices 306 receive the sensory device command metadata from the RoSE engine 304 and realize sensory effects defined in each scene by synchronizing it with the media.

The media player 308 is a device for reproducing media such as TV. Since the media player 308 is a kind of device for representing video and audio, the media reproduce 308 may be included in the sensory device 306. However, in FIG. 3, the media player 308 is independently shown for convenience. The media player 308 receives media from the RoSE engine 304 or through additional path and reproduces the received media.

<Method and Apparatus for Generating Sensory Media>

Hereinafter, a method and apparatus for generating sensory media in accordance with an embodiment of the present invention will be described in detail.

The method for generating sensory media according to the present embodiment includes receiving sensory effect information about sensory effects applied to media; and generating sensory effect metadata including the sensory effect information. The sensory effect metadata includes sensory effect description information. The sensory effect description information includes media location information. The media location information describes about locations in media where sensory effects are applied to.

The method for generating sensory media according to the present embodiment further includes transmitting the generated sensory effect metadata to a RoSE engine. The sensory effect metadata may be transmitted as independent data separated from media. For example, when a user requests a movie service, a provider may transmit sensory effect metadata with media data (movie). If a user already has a predetermined media data (movie), a provider may transmit only corresponding sensory effect data applied to the media data.

The method for generating sensory media according to the present invention further includes generating sensory media by packaging the generated sensory effect metadata with media and transmitting the generated sensory media. A provider may generate sensory effect metadata for media, generate sensory media by combining or packaging the generated sensory effect metadata with media, and transmit the generated sensory media to the RoSE engine. The sensory media may be formed of files in a sensory media format for representing sensory effects. The sensory media format may be a file format to be defined as a standard for representing sensory effects.

In the method for generating sensory media according to the present embodiment, the sensory effect metadata includes sensory effect description information that describes sensory effects. The sensory effect metadata further includes general information about generation of metadata. The sensory effect description information includes media location information that shows locations in media where the sensory effects are applied to. The sensory effect description information further includes sensory effect segment information about segments of media. The sensory effect segment information may include effect list information about sensory effects to be applied to segments in media, effect variable information and segment location information representing locations where sensory effects are applied to. The effect variable information may include sensory effect fragment information containing at least one of sensory effect variables that are applied at the same time.

Figure 4:
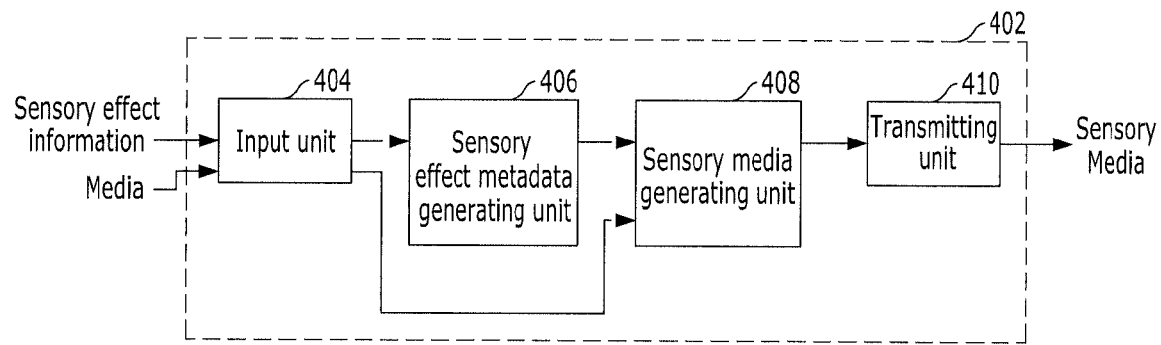
FIG. 4 is a diagram illustrating a sensory media generator in accordance with an embodiment of the present invention.

FIG. 4 is a diagram illustrating a sensory media generator in accordance with an embodiment of the present invention.

Referring to FIG. 4, the sensory media generator 402 includes an input unit 404 for receiving sensory effect information about sensory effects applied to media, and a sensory effect metadata generating unit 406 for generating sensory effect metadata including sensory effect information. The sensory effect metadata includes sensory effect description information that describes sensory effects. The sensory effect description information includes media location information that represents locations in media where sensory effects are applied to. The sensory media generator 402 further includes a transmitting unit 410 for transmitting sensory effect metadata to a RoSE engine. Here, the media may be input through the input unit 404 and transmitted to the RoSE engine or a media player through the transmitting unit 410. Alternatively, the media may be transmitted to the RoSE engine or the media player through an additional path without passing through the input unit 404.

Meanwhile, the sensory media generator 402 may further include a sensory media generating unit 408 for generating sensory media by packaging the generated sensory effect metadata with media. The transmitting unit 410 may transmit the sensory media to the RoSE engine. When the sensory media is generated, the input unit 404 receives the media. The sensory media generating unit 408 generates sensory media by combining or packaging the input media from the input unit 404 with the sensory effect metadata generated from the sensory effect metadata generating unit 406.

The sensory effect metadata includes sensory effect description information that describes sensory effects. The sensory effect metadata may further include general information having information about generation of metadata. The sensory effect description information may include media location information that shows locations in media where sensory effects are applied to. The sensory effect description information may further include sensory effect segment information about segments of media. The sensory effect segment information may include effect list information about sensory effects applied to segments of media, effect variable information, and segment location information that shows locations in segments where sensory effects are applied to. The effect variable information includes sensory effect fragment information. The sensory effect fragment information includes at least one of sensory effect variables that are applied at the same time.

<Method and Apparatus for Representing Sensory Effects>

Hereinafter, a method and apparatus for representing sensory effects in accordance with an embodiment of the present invention will be described in detail.

The method for representing sensory effects according to the present embodiment includes receiving sensory effect metadata including sensory effect information about sensory effects applied to media, obtaining the sensory effect information by analyzing sensory effect metadata; and generating sensory device command metadata to control sensory devices corresponding to the sensory effect information. The method for representing sensory effects according to the present embodiment further includes transmitting the generated sensory effect command metadata to sensory devices. The sensory device command metadata includes sensory device command description information for controlling sensory devices.

The method for representing sensory effects according to the present embodiment further includes receiving sensory device capability metadata. The receiving sensory device capability metadata may further include referring to capability information included in the sensory device capability metadata.

The method for representing sensory effects according to the present embodiment may further include receiving user sensory preference metadata having preference information about predetermined sensory effects. The generating sensory device command metadata may further include referring to the preference information included in user sensory preference metadata.

In the method for representing sensory effects according to the present embodiment, the sensory device command description information included in the sensory device command metadata may include device command general information that includes information about whether a switch of a sensory device is turned on or off, about a location to setup, and about a direction to setup. Further, the sensory device command description information may include device command detail information. The device command detail information includes detailed operation commands for sensory devices.

Figure 5:
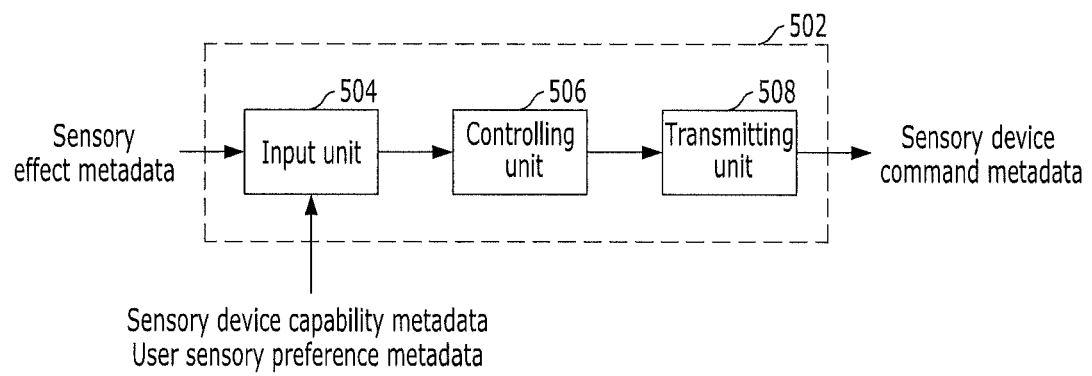
FIG. 5 is a block diagram illustrating an apparatus for representing sensory effects in accordance with an embodiment of the present invention.

FIG. 5 is a block diagram illustrating an apparatus for representing sensory effects, which is referred to as a representation of sensory effects (RoSE) engine, in accordance with an embodiment of the present invention.

Referring to FIG. 5, the RoSE engine 502 according to the present embodiment includes an input unit 504 for receiving sensory effect metadata having sensory effect information about sensory effects applied to media, and a controlling unit 506 for obtaining sensory effect information by analyzing the received sensory effect metadata and generating sensory effect command metadata to control sensory devices corresponding to the sensory effect information. The sensory device command metadata includes sensory device command description information to control sensory devices. The RoSE engine 502 may further include a transmitting unit 508 for transmitting the generated sensory device command metadata to sensory devices.

The input unit 504 may receive sensory device capability metadata that include capability information about capabilities of sensory devices. The controlling unit 506 may refer to the capability information included in the sensory device capability metadata to generate sensory device command metadata.

The input unit 504 may receive user sensory preference metadata that includes preference information about preferences of predetermined sensory effects. The controlling unit 506 may refer to the preference information included in the user sensory preference metadata to generate the sensory device command metadata.

The sensory device command description information in the sensory device command metadata may include device command general information that includes information about whether a switch of a sensory device is turned on or off, about a location to setup, and about a direction to setup. The sensory device command description information may include device control detail information including detailed operation commands for each sensory device.

<Method and Apparatus for Providing Sensory Device Capability Information>

Hereinafter, a method and apparatus for providing sensory device capability information in accordance with an embodiment of the present invention will be described in detail.

The method for providing sensory device capability information according to the present embodiment includes obtaining capability information about sensory devices; and generating sensory device capability metadata including the capability information. The sensory device capability metadata includes device capability information that describes capability information. The method for providing sensory device capability information according to the present embodiment may further include transmitting the generated sensory device capability metadata to a RoSE engine.

Meanwhile, the method for providing sensory device capability information according to the present embodiment may further include receiving sensory device command metadata from the RoSE engine and realizing sensory effects using the sensory device command metadata. The RoSE engine generates the sensory effect device command metadata by referring to the sensory device capability metadata.

In the method for providing sensory device capability information according to the present embodiment, the device capability information in the sensory device capability metadata may include device capability common information that include information about locations and directions of sensory devices. The device capability information includes device capability detail information that includes information about detailed capabilities of sensory devices.

Figure 6:
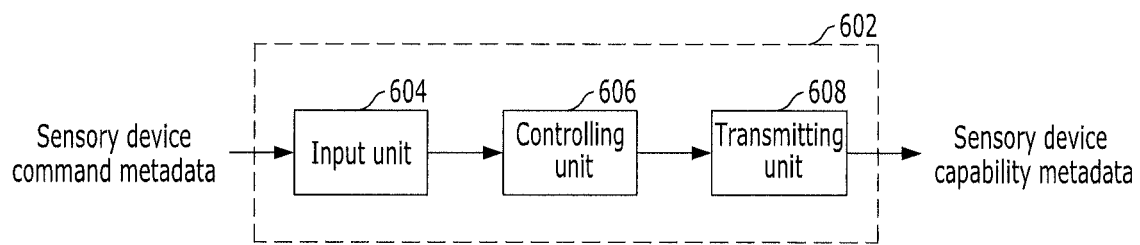
FIG. 6 is block diagram illustrating an apparatus for providing sensory device capability information in accordance with an embodiment of the present invention.

FIG. 6 is block diagram illustrating an apparatus for providing sensory device capability information in accordance with an embodiment of the present invention.

The apparatus 602 for providing sensory device capability information may be a device having the same function of a sensory device or may be a sensory device itself. The apparatus 602 may be a stand-alone device independent from a sensory device.

As shown in FIG. 6, the apparatus for providing sensory device capability metadata includes a controlling unit 606 for obtaining capability information about capabilities of sensory devices and generating the sensory device capability metadata including capability information. Here, the sensory device capability metadata includes device capability information that describes capability information. The apparatus for providing sensory device capability information according to the present embodiment further include a transmitting unit 608 for transmitting the generated sensory device capability metadata to the RoSE engine.

The apparatus 602 for providing sensory device capability information may further include an input unit 604 for receiving sensory device command metadata from the RoSE engine. The RoSE engine refers to the sensory device capability metadata to generate the sensory device command metadata. Here, the controlling unit 606 realizes sensory effects using the received sensory device control metadata.

Here, the device capability information included in the sensory device capability metadata may include device capability common information that includes information about locations and directions of sensory devices. The device capability information may include device capability detail information including information about detailed capabilities of sensory devices.

<Method and Apparatus for Providing User Preference Information>

Hereinafter, a method and apparatus for providing user preference information in accordance with an embodiment of the present invention will be described.

The method for providing user preference information according to the present embodiment includes receiving preference information about predetermined sensory effects from a user, generating user sensory preference metadata including the received preference information. The user sensory preference metadata includes personal preference information that describes preference information. The method for providing user sensory preference metadata according to the present embodiment further includes transmitting the user sensory preference metadata to the RoSE engine.

The method for providing user sensory preference metadata according to the present embodiment may further include receiving sensory device command metadata from a RoSE engine and realizing sensory effects using sensory device command metadata. Here, the RoSE engine refers to the received user sensory preference metadata to generate the sensory device command metadata.

In the method for providing user sensory preference metadata according to the present embodiment, the preference information may include personal information for identifying a plurality of users and preference description information that describes sensory effect preference information of each user. The preference description information may include effect preference information including detailed parameters for at least one of sensory effects.

Figure 7:
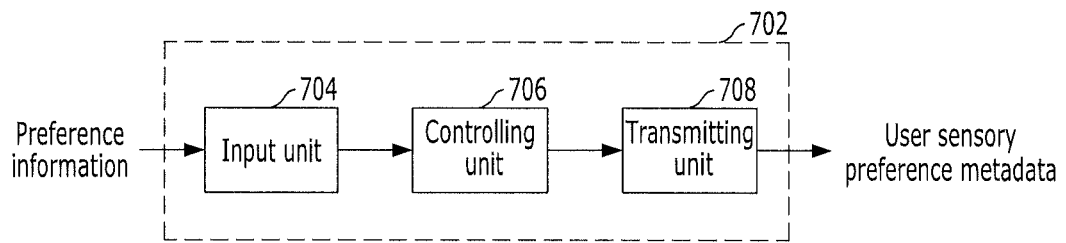
FIG. 7 is a block diagram illustrating an apparatus for providing user sensory preference information in accordance with an embodiment of the present invention.

FIG. 7 is a block diagram illustrating an apparatus for providing user sensory preference information in accordance with an embodiment of the present invention.

The apparatus 702 for providing user sensory preference information according to the present embodiment may be a device having the same function of a sensory device or a sensory device itself. Also, the apparatus 702 may be a stand-alone device independent from the sensory device.

As shown in FIG. 7, the apparatus 702 for providing user sensory preference information according to the present embodiment includes an input unit 704 for receiving preference information about predetermined sensory effects from a user and a controlling unit 706 for generating user sensory preference metadata including the received preference information. The user sensory preference metadata includes personal preference information that describes the preference information. The apparatus 702 for providing user sensory preference information according to the present embodiment may further include a transmitting unit 708 for transmitting the generated user sensory preference metadata to the RoSE engine.

The input unit 704 may receive sensory device command metadata from the RoSE engine. The RoSE engine refers to the user sensory preference metadata to generate the sensory device command metadata. The controlling unit 706 may realize sensory effects using the received sensory device command metadata.

The personal preference information included in the user sensory preference metadata includes personal information for identifying each of users and preference description information that describes sensory effect preference of each user. The preference description information may further include effect preference information including detailed parameters about at least one of sensory effects.

<User Sensory Preference Metadata>

Hereinafter, user sensory preference metadata will be described in detail.

Representation of sensory effect (RoSE) framework augments sensory effect experience of a user. Such a RoSE framework covers various types and ranges of effects. Therefore, it is necessary to reflect user sensory preference metadata (USP) to control sensory devices that realize sensory effects. In order to satisfy general requirements of the RoSE framework and the user sensory preference metadata, a XML schema that describes user preference information is defined in the present embodiment of the present invention. Since a framework according to the present embodiment has a simple structure and formed based on standard XML description, the framework according to the present embodiment is machine-readable.

In order to guarantee extensibility, a user sensory preference (USP) schema is defined to describe preference information of each user or a group. The USP schema supports a function of adding preference information of other user, a function of removing preference information of a predetermined sensory effect, and a function of editing previously defined preference information. For example, the USP schema can express preference information of family members. The schemas according to the present embodiment describe preference information about complex properties of sensory effects, for examples, flower scent in a front location and a warm wind effect. The USP schema according to the present embodiment provides flexibility that enables a user to select a level-type or a unit-type. Further, the USP schema according to the present embodiment reduces or amplifies a predetermined sensory effect using a preference ratio. For example, when a user wants stronger cooling effect in summer, a corresponding sensory effect may be amplified.

The user sensory preference metadata schema according to the present embodiment is designed for the RoSE engine to effectively render sensory effects with reference to user preference information. In order to guarantee extensibility, the user sensory preference metadata is divided into three levels, personal preference information, preference description information, and effect preference information.

The personal preference information describes personal information and preferences of each user. The personal preference information may include preferences of a plurality of users. For example, the user sensory preference metadata may include preferences of family members. Users may be allowed to select one of the preference information or the RoSE engine may estimate preference information of a corresponding family.

The preference description information stores different preferences of a plurality of user. Therefore, the preference description information enables the RoSE engine to dynamically provide effects according to preferences of each user. For example, when a user watches a movie in the middle of night, the RoSE engine may suggest a night preference to a user, which controls a sound volume of a movie not to be too loud.

The effect preference information provides a list of effect properties. In order to describe new types of sensory effects that would be introduced in near future, features of sensory effects are arranged in the same level in the present embodiment. For example, with the effect preference information, it is possible to describe a sensory effect of low temperature, humidity atmosphere, and purple fog.

In order to describe metadata information and personal information, Description Metadata Type of MPEG-7 is used in the present embodiment, and LonWorks standards are referred to specify a user of sensory effect.

The user sensory preference metadata according to the present embodiment may be combined with a media related technology such as MPEG-7 and a network related technology such as LonWorks. As the network related technology such as LonWorks, Standard network variable type (SNVTs) may be used. In this case, a namespace prefix may be used to identify a metadata type. A namespace of the user sensory preference metadata according to the present embodiment is defined as ":USP:ver1:represent:UserSensoryPreference: 2008:07". Prefixes for corresponding predetermined namespaces are used for clarification. Table 1 shows prefixes and corresponding namespaces.

TABLE 1

| Prefix | Corresponding namespace |
| --- | --- |
| USP | urn:USP:ver1:represent:UserSensoryPreferences:2008-07 |
| snvt | urn:SNVT:ver1:Represent:VariableList:2007:09 |
| mpeg7 | urn:mpeg:mpeg7:schema:2001 |

Hereinafter, the definition and semantics of the user sensory preference metadata scheme will be described in detail.

Figure 8:
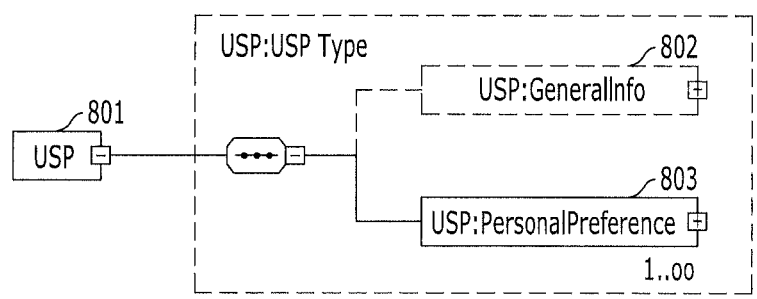
FIG. 8 is a diagram illustrating user sensory preference metadata (USP) in accordance with an embodiment of the present invention.

FIG. 8 is a diagram illustrating user sensory preference metadata in accordance with an embodiment of the present invention.

Referring to FIG. 8, the user sensory preference metadata (USP) 801 includes at least one personal preference information (PersonalPreference) 803. The user sensory preference metadata (USP) 801 may further include general information (GeneralInfo) 802. Table 2 shows these constituent elements of the user sensory preference metadata according to the present embodiment.

TABLE 2

| Name | Definition |
| --- | --- |
| GeneralInfo | This element is the container for the information of the USP metadata |
| PersonalPreference | This element is the container for the personal information and sensory effect preferences |

The general information (GeneralInfo) 802 includes information related to generation of the user sensory preference metadata 801. The personal preference information (PersonalPreference) 803 includes personal information and sensory effect preference information.

A schema for the user sensory preference metadata 801 is exemplary shown as follows.

```
<element name="USP" type="USP:USPType"/>
    <complexType name="USPType">
        <sequence>
            <elementname="GeneralInfo"type="mpeg7:
                DescriptionMetadataType" minOccurs="0"/>
            <element name="PersonalPreference" type =
            "USP:PersonalPreferencesType "
            maxOccurs="unbounded"/>
        </sequence>
    </complexType>
```

Figure 9:
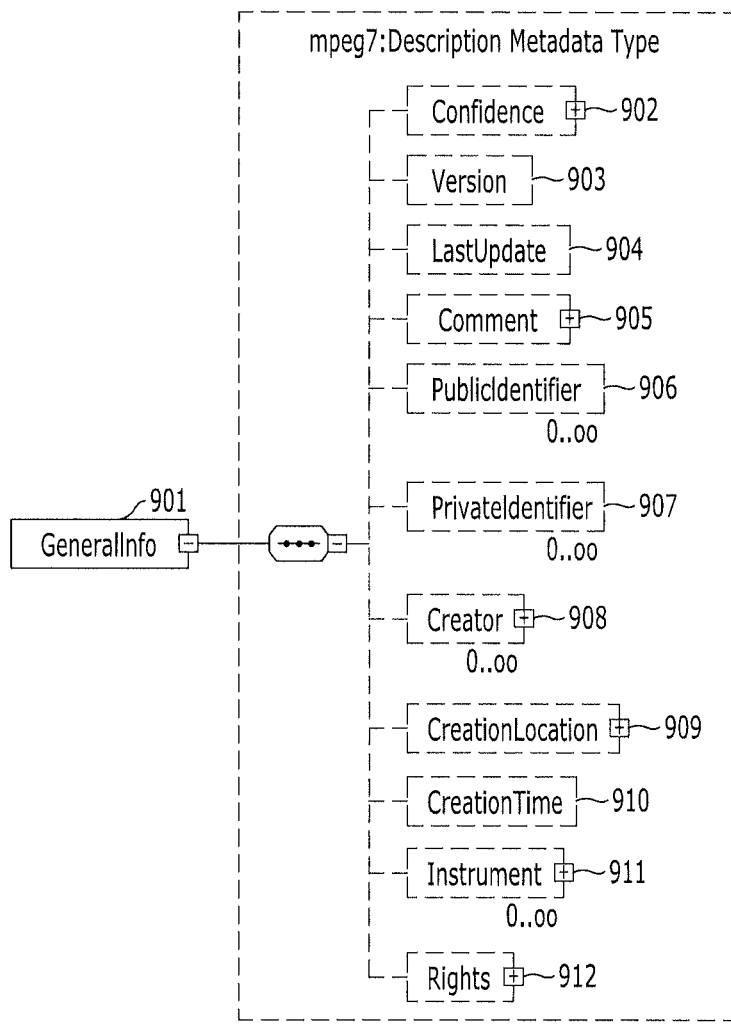
FIG. 9 is a diagram illustrating general information (GeneralInfo) included in user sensory preference metadata in accordance with an embodiment of the present invention.

FIG. 9 is a diagram illustrating general information (GeneralInfo) included in user sensory preference metadata in accordance with an embodiment of the present invention.

The general information includes information about the generation of the sensory effect metadata. Referring to FIG. 9, the general information (GeneralInfo) 901 may includes following constituent elements: Confidence 902, Version 903, LastUpdat 904, Comment 905, PublicIdentifier 906, PrivateIdentifier 907, creator 908, CreationLocation 909, CreationTime 910, Instrument 911, and Rights 912.

The general information (GeneralInfo) 901 may include information about generation of general metadata. For example, the general information 901 may include information about a version, a latest update date, a creator, a creation time, a creation location, and a copyright. A type of the general information (GeneralInfo) 901 may be referred by mpeg7: DescriptionMetadtaType of MPEG-7.

A schema for the general information (GeneralInfo) 901 is exemplary shown as follows.

```
<complexType name="DescriptionMetadataType" >
    <complexContent>
        <extension base="mpeg7:HeaderType">
            <sequence>
                <element name="Confidence"
                    type="mpeg7:zeroToOneType"
                    minOccurs="0"/>
                <element name="Version" type="string"
                    minOccurs="0"/>
                <element name="LastUpdate"
                    type="mpeg7:timePointType"
                    minOccurs="0"/>
                <element name="Comment"
                    type="mpeg7:TextAnnotationType"
                    minOccurs="0"/>
                <element name="PublicIdentifier"
                    type="mpeg7:UniqueIDType" minOccurs="0"
                    maxOccurs="unbounded"/>
                <element name="PrivateIdentifier"
                    type="string"
                    minOccurs="0" maxOccurs="unbounded"/>
                <element name="Creator" type="mpeg7:CreatorType"
                    minOccurs="0" maxOccurs="unbounded"/>
                <element name="CreationLocation"
                    type="mpeg7:PlaceType"
                    minOccurs="0"/>
                <element name="CreationTime"
                    type="mpeg7:timePointType"
                    minOccurs="0"/>
                <element name="Instrument"
                    type="mpeg7:CreationToolType"
                    minOccurs="0" maxOccurs="unbounded"/>
                <element name="Rights" type="mpeg7:RightsType"
                    minOccurs="0"/>
            </sequence>
        </extension>
    </complexContent>
</complexType>
```

Figure 10:
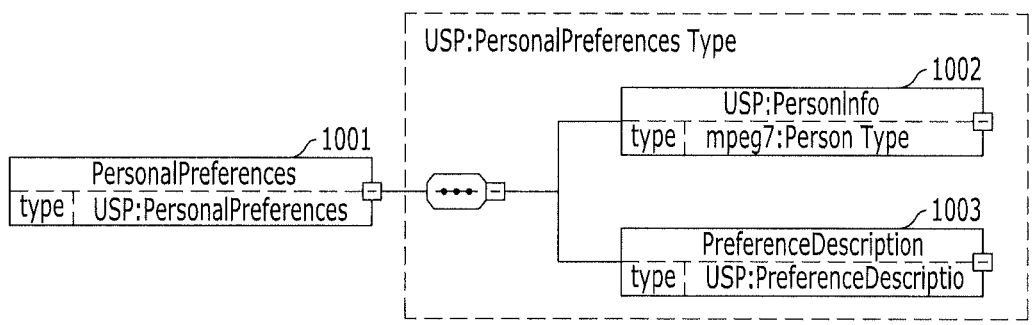
FIG. 10 is a diagram illustrating personal preference information (PersonalPreference) included in user sensory preference metadata in accordance with an embodiment of the present invention.

FIG. 10 is a diagram illustrating personal preference information (PersonalPreference) included in user sensory preference metadata in accordance with an embodiment of the present invention.

The personal preference information (Personal Preference) includes information about all effects applied to media. The personal preference information (Personal Preference) may include a plurality of preferences. Referring to FIG. 10, the personal preference information (Personal Preference) 1001 may include personal information (PersonalInfo) 1002 and preference description information (PreferenceDescription) 1003. Table 3 shows these constituent elements included in the personal preference information in detail.

TABLE 3

| Name | Definition |
| --- | --- |
| PersonInfo | This element describe the personal information using the mpeg7:PersonType. |
| PreferenceDescription | This element is the container for each user's sensory effect preferences |

The personal information (PersonInfo) 1002 describes personal information using mpeg7:PersonType. The preference description information (preferenceDescription) 1003 includes sensory effect preferences of each user.

A schema for personal preference 1001 is exemplary shown as follows.

```
<element name="PersonalPreferences" type= "USP: PersonalPreferencesType"/>
    <complexType name="PersonalPreferencesType">
        <sequence>
            <element name="PersonInfo" type="mpeg7:PersonType"/>
            <element name="PreferenceDescription"
                type="USP:PreferenceDescriptionType"
                maxOccurs="unbounded"/>
        </sequence>
    </complexType>
```

Figure 11:
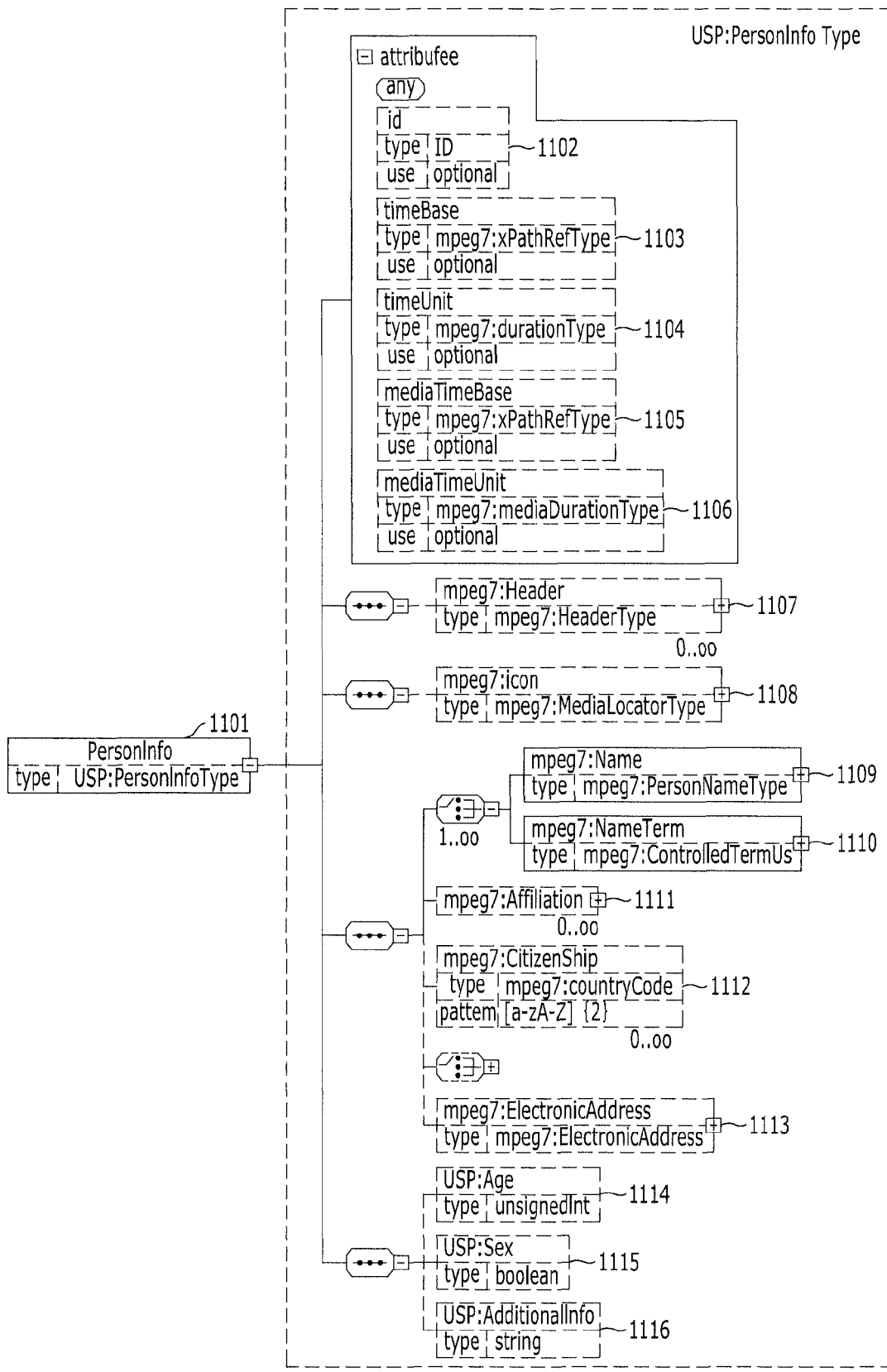
FIG. 11 is a diagram illustrating personal information (PersonalInfo) included in user sensory preference metadata in accordance with an embodiment of the present invention.

FIG. 11 is a diagram illustrating personal information (PersonalInfo) included in user sensory preference metadata in accordance with an embodiment of the present invention.

The personal information (PersonalInfo) includes personal information inquired by the RoSE engine. A type of the personal information (PersonInfoType) is an expansion based on mpeg7:PersonType. Referring to FIG. 11, the personal information (PersonalInfo) 1101 includes elements as follows: an identifier (ID) 1102, a time base (timeBase) 1103, a time unit (timeUnit) 1104, a media time base (mediaTimeBase) 1105, a media time unit (mediaTimeUnit) 1106, a header (Header) 1107, an icon (Icon) 1108, a name (Name) 1109, a name Term (NameTerm) 1110, an affiliation (Affiliation) 1111, a citizenship (Citizenship) 1112, an electronic address (ElectronicAddress) 1113, an age (Age) 1114, a sex (Sex) 1115, and additional information (AdditionalInfo) 1116. Table 4 shows these constituent elements of the personal information (PersonalInfo) in detail.

TABLE 4

| Name | Definition |
| --- | --- |
| Age | This element is the age of the person using the unsignedInt type. |
| Sex | This element is the sex of the person using the boolean type. |
| AdditionalInfo | This element is the addition information using the string type. (e.g. "color blindness") | mpeg7:PersonType defines an identifier (ID) 1102, a time base (timeBase) 1103, a time unit (timeUnit) 1104, a media time base (mediaTimeBase) 1105, a media time unit (mediaTimeUnit) 1106, a header (Header) 1107, an icon (Icon) 1108, a name (Name) 1109, a name Term (NameTerm) 1110, an affiliation (Affiliation) 1111, a citizenship (Citizenship) 1112, and an electronic address (ElectricAddress) 1113. The age (Age) 1114 denotes an age of a user using an unsigned internal type. The sex (Sex) 1115 represents the sex of a user using a boolean type. The additional information (AdditionalInfo) 1116 shows additional information using a string type, for example, color blindness.

A schema of the personal information (PersonlInfo) is exemplary shown as follows.

```
<element name="PersonInfo" type="USP:PersonInfoType"/>
    <complexType name="PersonInfoType">
        <complexContent>
            <extension base="mpeg7:PersonType">
                <sequence>
                    <element name="Age" type="unsignedInt"
                        minOccurs="0"/>
                    <element name="Sex" type= "boolean"
                        minOccurs="0"/>
                    <element name="AdditionalInfo" type="string"
                        minOccurs="0"/>
                </sequence>
            </extension>
        </complexContent>
    </complexType>
```

Figure 12:
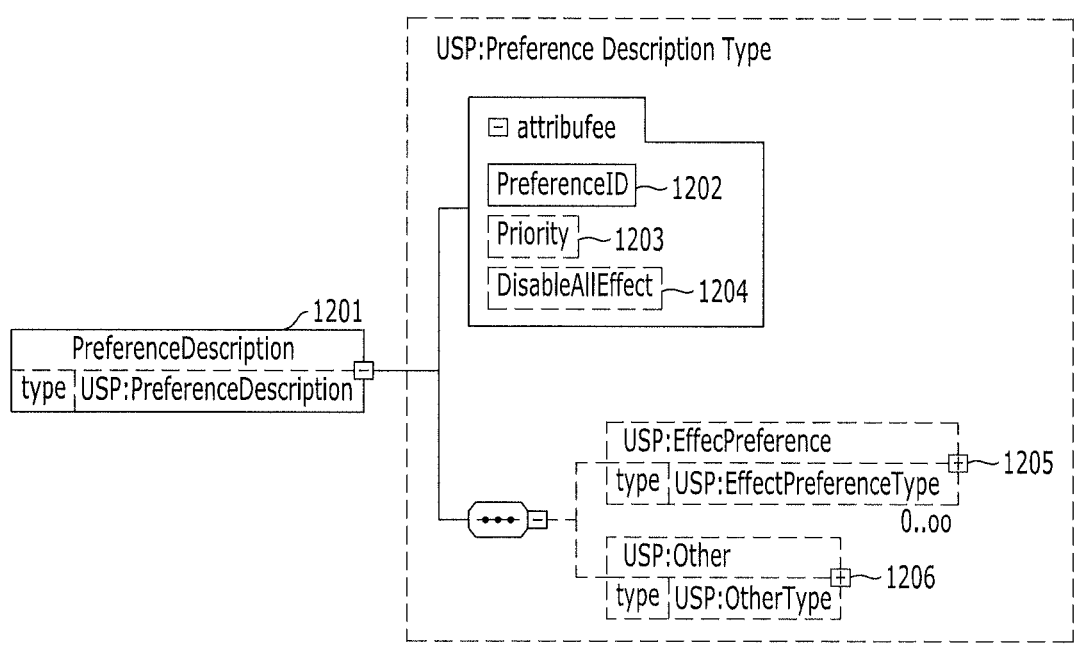
FIG. 12 is a diagram illustrating preference description information (PreferenceDescription) included in user sensory preference metadata in accordance with an embodiment of the present invention.

FIG. 12 is a diagram illustrating preference description information (PreferenceDescription) included in user sensory preference metadata in accordance with an embodiment of the present invention.

The preference description information includes preference descriptors and subordinate effect information. The preference description information describes about detailed sensory effect preference of a user. Referring to FIG. 12, the preference description information 1201 may include following elements: PreferenceID 1202, Priority 1203, DisableAllEffect 1204, EffectPreference 1205, and Other 1206. Table 5 shows these constituent elements of the preference description information 1201 in detail.

TABLE 5

| Name | Definition |
|---|---|
| PreferenceID | This attribute is the preference identifier using the ID type. |
| Priority | This attribute is the priority of the preference using the unsignedint type. |
| DisableAllEffect | This attribute is the switch to turn off all effect using the boolean type. |
| EffectPreference | This element contains detailed preferences of each sensory effect properties |
| Other | This element represent other elements for future extension using the USP:Other Type as follows.<br><complexType name="OtherType" mixed="true"><br>  <sequence><br>    <any namespace="##any"/><br>  </sequence><br></complexType> |

The PreferenceID 1202 shows a preference ID attribute using an ID type. The Priority 1203 is an attribute representing the priority of preference information using an unsigned integer type. The DisableAllEffect 1204 represents a switch property showing whether all of effects are turned off or not using a boolean type. The EffectPreference 1205 is an element including detailed preference information of each sensory effect property. The Other 1206 represents other elements for future extension using USP:OtherType.

```
<complexType name="OtherType" mixed="true">
    <sequence>
        <any namespace="##any"/>
    </sequence>
</complexType>
```

A schema for preference description information 1201 is exemplary shown as follows.

```
<element name="PreferenceDescription" type="USP:
PreferenceDescriptionType"/>
    <complexType name="PreferenceDescriptionType">
        <sequence>
            <element name= "EffectPreference"
            type="USP:EffectPreferenceType"
            maxOccurs="unbounded"/>
            <element name="Other" type="USP:OtherType"
            minOccurs="0"/>
        </sequence>
    <attribute name="PreferenceID" type="ID" use= "required"/>
    <attribute name="Priority" type="unsignedInt"/>
    <attribute name="DisableAllEffect" type="boolean"/>
</complexType>
```

Figure 13:
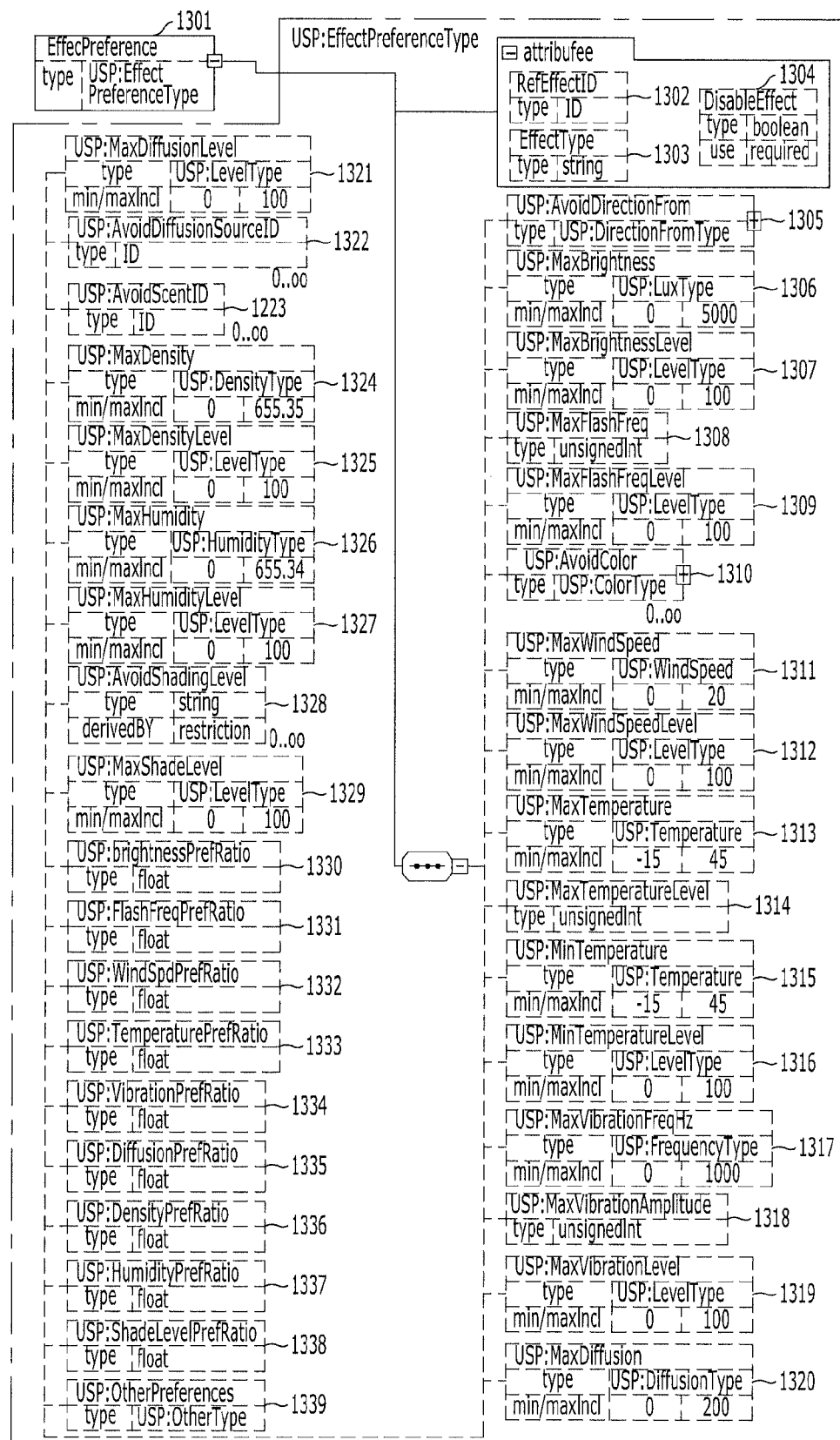
FIG. 13 is a diagram illustrating effect preference information (EffectPreference) included in user sensory preference metadata in accordance with an embodiment of the present invention.

FIG. 13 is a diagram illustrating effect preference information (EffectPreference) included in user sensory preference metadata in accordance with an embodiment of the present invention.

The effect preference information (EffectPreference) includes elements for describing detailed sensory effect environmental information. In the present embodiment, properties that properly describe user preferences are selected in consideration of intrinsic properties of various sensory effects. The effect preference information expresses predetermined parameters of sensory effect properties to be used for device adaptation. It may describe user preference information as a preference ratio, for example, a 10 m/s wind speed or 50% of a maximum wind speed. Referring to FIG. 13, the effect preference information (EffectPreference) 1301 may include following elements: RefEffectID 1302, EffectType 1303, and DisableEffect 1304. Further, the effect preference information (EffectPreference) 1301 includes following elements: AvoidDirectionFrom 1305, MaxBrightness 1306, MaxBrightnessLevel 1307, MaxFlashFreq 1308, MaxFlashFreqLevel 1309, AvoidColor 1310, MaxWindSpeed 1311, MaxWindSpeedLevel 1312, MaxTemperature 1313, MaxTemperatureLevel 1314, MinTemperature 1315, inTemperatureLevel 1316, MaxVibrationFreqHz 1317, MaxVibrationAmplitude 1318, MaxVibrationLevel 1319, MaxDiffusion 1320, MaxDiffusionLevel 1321, AvoidDiffusionSourceID 1322, AvoidScentID 1323, MaxDensity 1324, MaxDensityLevel 1325, MaxHumidity 1326, MaxHumidityLevel 1327, AvoidShadingMode 1328, MaxShadeLevel 1329, BrightnessPrefRatio 1330, FlashFreqPrefRatio 1331, WindSpdPrefRatio 1332, TemperaturePrefRatio 1333, VibrationPrefRatio 1334, DiffusionPrefRatio 1335, DensityPrefRatio 1336, HumidityPrefRatio 1337, ShadeLevelPrefRatio 1338 and OtherPreferences 1339. Table 6 shows the above constituent attributes and elements of the effect preference information 1301 in detail.

TABLE 6

| Name | Definition |
|---|---|
| RefEffectID | This attribute is the reference of specific effectID in the RoSE media using the ID type. |
| EffectType | This attribute is the type sensory effect using the string type. (e.g. flash light) |
| DisableEffect | This attribute is the switch to present or ignore the specific effect preference using the Boolean type. |
| AvoidDirection From | This element describes directions of sensory effects which must be excluded. It uses USP:DirectionFromType as follows.<br><complexType name="DirectionFromType"><br>  <attribute name="Front" type="boolean" use="optional"/><br>  <attribute name="Rear" type="boolean" use="optional"/><br>  <attribute name="Left" type="boolean" use="optional"/><br>  <attribute name="Right" type="boolean" use="optional"/><br>  <attribute name="Upper" type="boolean" use="optional"/><br>  <attribute name="Lower" type="boolean" use="optional"/><br></complexType> |

TABLE 6-continued

| Name | Definition |
|---|---|
| MaxBrightness | This element describes the maximum allowed brightness value by lux (lx) that the lighting effect device should support. The type is USP:Lux Type. |
| MaxBrightness Level | This element describes the maximum allowed brightness level that the lighting effect device should support. The type is USP:LevelType. |
| MaxFlashFreq | This element describes the maximum allowed frequency of flickering effect using the USP:FrequencyType. |
| MaxFlashFreq Level | This element describes the maximum allowed frequency level of flickering effect using the USP:LevelType. |
| AvoidColor | This element describes color values which must be regarded for color blindness. It uses USP:ColorType as follows.<br><complexType name="ColorType"><br>  <attribute name="r" use="required"><br>    <simpleType><br>      <restriction base="unsignedInt"><br>        <minInclusive value="0"/><br>        <maxInclusive value="255"/><br>      </restriction><br>    </simpleType><br>  </attribute><br>  <attribute name="g" use="required"><br>    <simpleType><br>      <restriction base="unsignedInt"><br>        <minInclusive value="0"/><br>        <maxInclusive value="255"/><br>      </restriction><br>    </simpleType><br>  </attribute><br>  <attribute name="b" use="required"><br>    <simpleType><br>      <restriction base="unsignedInt"><br>        <minInclusive value="0"/><br>        <maxInclusive value="255"/><br>      </restriction><br>    </simpleType><br>  </attribute><br></complexType> |
| MaxWindSpeed | This element describes the maximum allowed value for wind speed. The type is the USP:WindSpeedType. |
| MaxWindSpeedLevel | This element describes the maximum allowed level for wind speed. The type is the USP:LevelType. |
| MaxTemperature | This element describes the maximum allowed temperature value using the USP:TemperatureType. |
| MaxTemperature Level | This element describes the maximum allowed temperature level using the USP:LevelType. |
| MinTemperature | This element describes the minimum allowed temperature value using the USP:TemperatureType. |
| MinTemperature Level | This element describes minimum allowed temperature level using the USP:Level Type. |
| MaxVibrationFreq Hz | This element describes the maximum allowed vibration frequency. The type is the USP:FreqencyType. |
| MaxVibrationAmplitude | This element describes the maximum allowed vibration amplitude (mm). The type is the unsignedInt. |
| MaxVibrationLevel | This element describes the maximum allowed vibration level. The type is the USP:Level Type. |
| MaxDiffusion | This element describes the maximum allowed diffusion value. The type is the USP:DiffusionType. |
| MaxDiffusionLevel | This element describes the maximum allowed diffusion level. The type is the USP:Level Type. |
| AvoidDiffusion SourceID | This element describes the identification of diffusion materials which must be excluded. It uses the ID type. (e.g. The user doesn't want vapor fog.) |
| AvoidScentID | This element describes the identification of scent which must be excluded. It uses the ID type. (e.g. The user doesn't want any floral scent.) |
| MaxDensity | This element describes the maximum allowed density value using the USP:DensityType. |
| MaxDensityLevel | This element describes the maximum allowed density level using the USP:LevelType. |
| MaxHumidity | This element describes the maximum allowed humidity value using the USP:HumidityType. |
| MaxHumidityLevel | This element describes the maximum allowed humidity level using the USP:LevelType. |
| AvoidShadingMode | This element describes the identification of shading style of the device which must be excluded. It uses restricted string type as follows.<br><restriction base="string"><br>  <enumeration value="SideOpen"/><br>  <enumeration value="RollOpen"/><br>  <enumeration value="PullOpen"/><br>  <enumeration value="PushOpen"/><br></restriction> |

TABLE 6-continued

| Name | Definition |
|---|---|
| MaxShadeLevel | This element describes the maximum allowed the openness of the device using the USP:Level Type. (e.g. The user wants the curtain to be fully opened. |
| BrightnessPrefRatio | This element describes the ratio to amplify or reduce the brightness using the float type. (e.g. 2.0 of brightness ratio means user want 2 times more brightness) |
| FlashFreqPrefRatio | This element describes the ratio to amplify or reduce the frequency of flash effect using the float type. |
| WindSpdPrefRatio | This element describes the ratio to amplify or reduce the wind speed using the float type. |
| TemperaturePrefRatio | This element describes the ratio to amplify or reduce the temperature using the float type. |
| VibrationPrefRatio | This element describes the ratio to amplify or reduce the vibration intensity using the float type. |
| DiffusionPrefRatio | This element describes the ratio to amplify or reduce the diffusion intensity using the float type. |
| DensityPrefRatio | This element describes the ratio to amplify or reduce the density of the effect using the float type. |
| HumidityPrefRatio | This element describes the ratio to amplify or reduce the humidity of the effect using the float type. |
| ShadeLevelPrefRatio | This element describes the ratio to amplify or reduce the shading level using the float type. |
| OtherPreferences | This element represent other elements for future extension using the USP:Other Type as follows.<br><complexType name="OtherType" mixed="true"><br>  <sequence><br>    <any namespace="##any"/><br>  </sequence><br></complexType> |

The RefEffectID 1302 is an attribute representing a reference of a predetermined effect ID in media using an ID type. The EffectTYpe 1303 is an attribute showing a sensory effect type using a string type, for example, a flash light. The DisableEffect 1304 is a switch property to represent or ignore a predetermined effect environment using a Boolean type.

The AvoidDirectionFrom 1305 is an element that describes a direction of a sensory effect to be excluded. The AvoidDirectionFrom 1305 uses USP:DirectionFromType as follows.

```
<complexType name="DirectionFromType">
    <attribute name="Front" type="boolean" use="optional"/>
    <attribute name="Rear" type="boolean" use="optional"/>
    <attribute name="Left" type="boolean" use="optional"/>
    <attribute name="Right" type="boolean" use="optional"/>
    <attribute name="Upper" type="boolean" use="optional"/>
    <attribute name="Lower" type="boolean" use="optional"/>
</complexType>
```

The MaxBrightness 1306 is an element describing the maximum brightness in a unit of Lux 1x that a corresponding lighting device can support. A type of the MaxBrightness 1306 is LuxType. The MaxBrightnessLevel 1307 is an element describing the maximum brightness in a unit of level that a corresponding lighting device can support. A type thereof is a level type. The MaxFlashFreq 1308 is an element describing the maximum frequency of flickering effect using a frequency type. The MaxFlashFreqLevel 1309 is an element describing the maximum allowed frequency level of flickering effect using a level type. The AvoideColor 1310 is an element describing color values which must be regarded for color blindness. It uses a color type as follows.

```
<complexType name="ColorType">
    <attribute name="r" use=" required">
        <simpleType>
```

-continued

```
            <restriction base="unsignedInt">
                <minInclusive value="0"/>
                <maxInclusive value="255"/>
            </restriction>
        </simpleType>
    </attribute>
    <attribute name="g" use="required">
        <simpleType>
            <restriction base= "unsignedInt">
                <minInclusive value="0"/>
                <maxInclusive value="255"/>
            </restriction>
        </simpleType>
    </attribute>
    <attribute name="b" use="required">
        <simpleType>
            <restriction base="unsignedInt">
                <minInclusive value="0"/>
                <maxInclusive value="255"/>
            </restriction>
        </simpleType>
    </attribute>
</complexType>
```

The MaxWindSpeed 1311 is an element describing the maximum allowed value for wind speed. The type of MaxWindSpeed is a WindSpeed Type. The MaxWindSpeedLevel 1312 is an element describing the maximum allowed level for wind speed. The type thereof is a level type. The MaxTemperature 1313 is an element describing the maximum allowed temperature value using a TemperatureType. The MaxTemperatureLevel 1314 is an element describing the maximum allowed temperature level using the level type. The MinTemperature 1315 is an element describing the minimum allowed temperature value using a temperature type. The MinTemperatureLevel 1316 is an element describing the minimum allowed temperature level using a level type.

The MaxVibrationFreqHz 1317 is an element describing the maximum allowed vibration frequency. The type thereof is a frequency type. The MaxvibrationAmplitude is an element describing the maximum allowed vibration amplitude.

The type thereof is an unsigned integer. The MaxVibrationLevel 1319 is an element describing the maximum allowed vibration level and the type thereof is a level type.

The MaxDiffusion 1320 is an element describing the maximum allowed diffusion value. The type thereof is a diffusion type. The MaxDiffusionLevel 1321 is an element describing the maximum allowed diffusion level. The type thereof is a level type. The AvoidDiffusionSourceId 1322 is an element describing the identification of diffusion materials with must be excluded. It uses an ID type. For example, a user may not want vapor fog.

The AvoidScentId 1323 is an element describing the identification of scent which muse be excluded. It uses an ID type. For example. A user may not want any floral scent. The MaxDensity 1324 is an element describing the maximum allowed density value using a density type. The MaxDensityLevel 1325 is an element describing the maximum allowed density level using a level type. The MaxHumidity 1326 is an element describing the maximum allowed humidity value using a humidity type. The MaxHumidityLevel 1327 is an element describing the maximum allowed humidity level using a level type.

The AvoideShadingMode 1328 is an element describing an identification of shading style of the device which must be excluded. It uses a restricted string type as follows.

```
<restriction base="string">
    <enumeration value="SideOpen"/>
    <enumeration value="RollOpen"/>
    <enumeration value="PullOpen"/>
    <enumeration value="PushOpen"/>
</restriction>
```

The MaxShadeLevel 1329 is an element describing the maximum allowed the openness of a device using a level type. For example, a user may want a curtain to be fully opened.

The BrightnessPrefRatio 1330 is an element describing a ratio to amplify or reduce the brightness using a float type. For example, 2.0 of brightness ratio means that a user wants 2 times more brightness. The FlashFreqPrefRatio 1331 is an element describing a ratio to amplify or reduce the frequency of flash effect using a float type. The WindSpdPrefRatio 1332 is an element describing a ratio to amplify or reduce a wind speed using a float type. The TemperaturePrefRatio 1333 is an element describing a ratio to amplify or reduce the temperature using a float type. The VibrationPrefRatio 1334 is an element describing a ratio to amplify or reduce a vibration intensity using a float type. The DiffusionPrefRatio 1335 is an element describing a ratio to amplify or reduce a diffusion intensity using a float type. The DensityPrefRatio 1336 is an element describing a ratio to amplify or reduce the density of an effect using a float type. The HumidityPrefRatio 1337 is an element describing a ratio to amplify or reduce the humidity of the effect using a float type. The ShadeLevelPrefRatio 1338 is an element describing a ratio to amplify or reduce a shading level using a float type. The OtherPreferences 1339 is an element representing other elements for future extension using other type.

```
<complexType name="OtherType" mixed="true">
    <sequence>
        <any namespace="##any"/>
    </sequence>
</complexType>
```

A schema of effect preference related to FIG. 13 is exemplary shown as follows.

```
<element name="EffectPreference" type="USP: EffectPreferenceType"/>
    <complexType name="EffectPreferenceType">
        <sequence>
            <element name="AvoidDirectionFrom"
                type="USP:DirectionFromType" minOccurs="0"/>
            <element name="MaxBrightness" type="USP:LuxType"
                minOccurs="0"/>
            <element name="MaxBrightnessLevel"
                type="USP:LevelType"
                minOccurs="0"/>
            <element name="MaxFlashFreq" type="unsignedInt"
                minOccurs="0"/>
            element name="MaxFlashFreqLevel"
                type="USP:LevelType"
                minOccurs="0"/>
            <element name="AvoidColor" type="USP:ColorType"
                minOccurs="0" maxOccurs="unbounded"/>
            <element name="MaxWindSpeed"
                type="USP:WindSpeedType"
                minOccurs="0"/>
            <element name="MaxWindSpeedLevelScale"
                type="USP:LevelType" minOccurs="0"/>
            <element name="MaxTemperature"
                type="USP:TemperatureType" minOccurs="0"/>
            <element name= "MaxTemperatureLevelScale"
                type="unsignedInt" minOccurs="0"/>
            <element name="MinTemperature"
                type="USP:TemperatureType" minOccurs="0"/>
            <element name="MinTemperatureLevel"
                type="USP:LevelType"
                minOccurs="0"/>
            <element name="MaxVibrationFreqHz"
                type="USP:FrequencyType" minOccurs = "0"/>
            <element name="MaxVibrationAmplitude"
                type="unsignedInt"
                minOccurs="0"/>
            <element name="MaxVibrationLevel"
                type="USP:LevelType"
                minOccurs="0"/>
            <element name="MaxDiffusion"
                type="USP:DiffusionType"
                minOccurs="0"/>
            <element name="MaxDiffusionLevel"
                type="USP:LevelType"
                minOccurs="0"/>
            <element name="AvoidDiffusionSourceID" type="ID"
                minOccurs="0" maxOccurs="unbounded"/>
            <element name="AvoidScentID" type="ID"
                minOccurs="0"
                maxOccurs="unbounded"/>
            <element name="MaxDensity" type="USP:DensityType"
                minOccurs="0"/>
            <element name="MaxDensityLevel"
                type="USP:LevelType"
                minOccurs="0"/>
            <element name="MaxHumidity"
                type="USP:HumidityType"
                minOccurs="0"/>
            <element name="MaxHumidityLevel"
                type="USP:LevelType"
                minOccurs="0"/>
            <element name="AvoidShadingMode" minOccurs="0"
                maxOccurs="unbounded">
                <simpleType>
                    <restriction base="string">
                        <enumeration value="SideOpen"/>
                        <enumeration value="RollOpen"/>
                        <enumeration value="PullOpen"/>
                        <enumeration value="PushOpen"/>
                    </restriction>
                </simpleType>
            </element>
            <element name="MaxShadeLevel" type="USP:LevelType"
                minOccurs="0"/>
            <element name="FlashFreqPrefRatio" type="float"
                minOccurs="0"/>
            <element name="WindSpdPrefRatio" type="float"
                minOccurs="0"/>
            <element name="TemperaturePrefRatio" type="float"
```

-continued
```
      minOccurs="0"/>
  <element name="VibrationPrefRatio" type="float"
    minOccurs="0"/>
  <element name="DiffusionPrefRatio" type="float"
    minOccurs="0"/>
  <element name="DensityPrefRatio" type="float"
    minOccurs="0"/>
  <element name="HumidityPrefRatio" type="float"
    minOccurs="0"/>
  <element name="BrightnessPrefRatio" type="float"
    minOccurs="0"/>
  <element name="ShadeLevelPrefRatio" type="float"
    minOccurs="0"/>
  <element name="OtherPreferences"
    type="USP:OtherType"
```

-continued
```
      minOccurs="0"/>
    </sequence>
    <attribute name="RefEffectID" type="ID"/>
    <attribute name="EffectType" type="string"/>
    <attribute name="DisableEffect" type="boolean"
      use="required"/>
</complexType>
```

Table 7 shows simple types. It is necessary to restrict an intensity value of sensory effect for safety purpose. In the present embodiment, a simple type for each sensory effect measurement unit is defined and it is referred in user sensory preference metadata.

TABLE 7

| Name | Definition |
|---|---|
| LuxType | This simple type represents degree of brightness using lux. The restriction base is the snvt:luxType. The value is restricted from 0 to 5000 lux.<br>`<simpleType name="LuxType">`<br>`  <restriction base="snvt:luxType">`<br>`    <maxInclusive value="5000"/>`<br>`  </restriction>`<br>`</simpleType>` |
| TemperatureType | This simple type represents the temperature using centigrade. The restriction base is the snvt:temp_pType. The value is restricted from 0 to 45.<br>`<simpleType name="TemperatureType">`<br>`  <restriction base="snvt:temp pType">`<br>`    <minInclusive value="-15"/>`<br>`    <maxInclusive value="45"/>`<br>`  </restriction>`<br>`</simpleType>` |
| VibrationType | This simple type represents the intensity of vibration using rpm. The restriction base is the snvt:rpm Type. The value is restricted from 0 to 20000.<br>`<simpleType name="VibrationType">`<br>`  <restriction base="snvt:rpm_Type">`<br>`    <maxInclusive value="20000"/>`<br>`  </restriction>`<br>`</simpleType>` |
| WindSpeedType | This simple type represents speed of wind using meter per second. The restriction base is the snvt:speed_milType. The value is restricted from 0 to 20.<br>`<simpleType name="WindSpeedType">`<br>`  <restriction base="snvt:speed_milType">`<br>`    <maxInclusive value="20"/>`<br>`  </restriction>`<br>`</simpleType>` |
| DensityType | This simple type represents the density of the diffusion source using parts per million. The restriction base is the snvt:ppmType.<br>`<simpleType name="DensityType">`<br>`  <restriction base="snvt:ppmType"/>`<br>`</simpleType>` |
| HumidityType | This simple type represents the humidity of the vapor using the unit inHg. The restriction base is the snvt:abs humidType.<br>`<simpleType name="HumidityType">`<br>`  <restriction base="snvt:abs_humidType"/>`<br>`</simpleType>` |
| FrequencyType | This simple type represents frequency using Hz. The restriction base is the snvt:rmp_Type. The value is restricted from 0 to 20000.<br>`<simpleType name="FrequencyType">`<br>`  <restriction base="snvt:freq_hzType"/>`<br>`</simpleType>` |
| LevelType | This simple type represents the level of the sensory effect intensity. The value is restricted from 0 to 100.<br>The restriction base is the unsignedInt.<br>`<simpleType name="LevelType">`<br>`  <restriction base="unsignedInt">`<br>`    <minInclusive value="0"/>`<br>`    <maxInclusive value="100"/>`<br>`  </restriction>`<br>`</simpleType>` |

Hereinafter, a definition and semantic of a SNVT schema related to LonWorks will be described.

LonWorks provides an open networking platform formed of a protocol designed by Echelon Corporation for networking devices connected through twisted pairs, power lines and fiber optics. LonWorks defines (1) a dedicated microprocessor known as an neuron chip which is highly optimized for devices on control network, (2) a transceiver for transmitting protocols on predetermined media such as twisted pairs or power lines, (3) a network database which is an essential software component of an open control system (which is also known as LNS network operating system), and (4) internet connection with standard network variable types (SNVTs). One of elements for interoperability in LonWorks is the standardization of SNVTs. For example, a thermostat using temperature SNVT has values between 0 to 65535 which are equivalent to a temperature range of −274° C. to 6279.5° C. DRESS media is rendered through devices that can be controlled by media metadata for special effect. A metadata schema for describing special effects may be designed based on a set restricted within SNVT data type for device control. Table 8 shows SNVT expression in LonWorks.

TABLE 8

SNVT_angle_deg (104)
Phase/Rotation

| SNVT Index | Measurement | Type Category | Type Size |
|---|---|---|---|
| 104 | Angular distance | Signed Long | 2 bytes |
| Valid Type Range | Type Resolution | Units | Invalid Value |
| −359.98 ... 360.00 | 0.02 | degrees | 32,767 (0x7FFF) |
| Raw Range | Scale Factors | File Name | Default Value |
| −17,999 ... 18,000 (0xB9B1 ... 0x4650) | 2, −2, 0  $S = a*10^{b}*(R + c)$ | N/A | N/A |

In Table 8, boxes surrounded with a bold line are translated to a XML schema. The box Type Category expresses a variable type using predefined variable types such as unsignedInt, float, decimal and Boolean. The box Valid type Range limits a range of values and the box Type Resolution defines a resolution to express a value. The box Units denotes a unit to express SNVT type. In case of SNVT_angle_deg, a proper unit thereof is degrees.

Table 9 describes SNVTs translated to XML schema.

TABLE 9

| Name | Definition |
|---|---|
| SNVT_lux | SNVT_lux describes illumination using lux. The type of SNVT_lux is snvt:luxType. The following table is provided in LonMark web site. Illumination (luminous-flux intensity) 1 lux = 1 lumen/m$^2$ As a comparison: 1 foot-candle = 1 lumen/ft$^3$. 1 foot-candle = 10.76 lux. SNVT Index      Measurement      Type Category     Type Size 79              Illumination     Unsigned Long     2 bytes Valid Type Range Type Resolution  Units             Invalid Value 0 ... 65,335    1                Lux Raw Range       Scale Factors    File Name         Default Value 0 ... 65,535    1, 0, 0          N/A               N/A (0 ... 0xFFFF)  $S = a * 10^{b} * (R + c)$ According to the definition, we design snvt:luxType. <simpleType name="luxType">   <restriction base="unsignedInt">     <minInclusive value="0"/>     <maxInclusive value="65534"/>   </restriction> </simpleType> |
| SNVT_speed_mil | SNVT_speed_mil describes linear velocity as m/s(meters/sec). The type of SNVT_speed_mil is snvt:speed_milType. Linear Velocity SNVT Index      Measurement      Type Category     Type Size 35              Linear Velocity  Unsigned Long     2 bytes Valid Type Range Type Resolution  Units             Invalid Value 0 ... 65,535    0.001            Meters per Second (m/s) Raw Range       Scale Factors    File Name         Default Value 0 ... 65,535    1, −3, 0         N/A               N/A (0 ... 0xFFFF)  $S = a * 10^{b} * (R + c)$ According to the definition, we design snvt:speed_milType. |

TABLE 9-continued

| Name | Definition |
|---|---|
| | `<simpleType name="speed_milType">`<br>  `<restriction base="float">`<br>    `<minInclusive value="0"/>`<br>    `<maxInclusive value="65,535"/>`<br>    `<fractionDigits value="3"/>`<br>  `</restriction>`<br>`</simpleType>` |
| SNVT_angle_deg | SNVT_angle_deg describes degree for phase and rotation. The type of SNVT_angle_deg is snvt:angle_degType.<br>Phase/Rotation<br>SNVT Index    Measurement    Type Category    Type Size<br>104    Angular distance    Signed Long    2 bytes<br>Valid Type Range    Type Resolution    Units    Invalid Value<br>−359.98 . . . 360.00    0.02    degrees    32,767 (0x7FFF)<br>Raw Range    Scale Factors    File Name    Default Value<br>−17,999 . . . 18,000    2, −2, 0    N/A    N/A<br>(0xB9B1 . . . 0x4650)    $S = a * 10^b * (R + c)$<br>According to the definition, we design snvt:angle_degType.<br>`<simpleType name="angle_degType">`<br>  `<restriction base="float">`<br>    `<minInclusive value="−359.9"/>`<br>    `<maxInclusive value="360.0"/>`<br>    `<fractionDigits value="1"/>`<br>  `</restriction>`<br>`</simpleType>`<br>(In the table of definition, Type Resolution is 0.02 but in schema we can not represent the resolution perfectly. So, we use only 0.1 type resolution using `<fractrionDigits value="1"/>`. It means a fraction digit is 1.) |
| SNVT_angle_vel | SNVT_angle_vel describes angular velocity using radians/sec. The type of SNVT_angle_vel is snvt:angle_velType.<br>Angular Velocity<br>SNVT Index    Measurement    Type Category    Type Size<br>4    Angular velocity    Signed Long    2 bytes<br>Valid Type Range    Type Resolution    Units    Invalid Value<br>−3276.8 . . . 3276.7    0.1    radians/second<br>Raw Range    Scale Factors    File Name    Default Value<br>−32,768 . . . 32,767    1, −1, 0    N/A    N/A<br>0x8000 . . . 0x7FFF)    $S = a * 10^b * (R + c)$<br>According to definition of SNVT_angle_vel, we design snvt:angle_velType.<br>`<simpleType name="angle_velType">`<br>  `<restriction base="float">`<br>    `<minInclusive value="−3276.8"/>`<br>    `<maxInclusive value="3276.7"/>`<br>    `<fractionDigits value="1"/>`<br>  `</restriction>`<br>`</simpleType>` |
| SNVT_mass_mil | SNVT_mass_mil represents mass using milligrams. The type of SNVT_mass_mil is snvt:mass_milType.<br>Mass<br>SNVT Index    Measurement    Type Category    Type Size<br>26    Mass    Unsigned Long    2 bytes<br>Valid Type Range    Type Resolution    Units    Invalid Value<br>0 . . . 6353.5    0.1    Milligrams (mg)<br>Raw Range    Scale Factors    File Name    Default Value<br>0 . . . 65,535    1, −1, 0    N/A    N/A<br>(0 . . . 0xFFFF)    $S = a * 10^b * (R + c)$<br>According to the definition of SNVT_mass_mil, we design snvg:mass_milType.<br>`<simpleType name="mass_milType">`<br>  `<restriction base="float">`<br>    `<minInclusive value="0"/>`<br>    `<maxInclusive value="6553.5"/>`<br>    `<fractionDigits value="1"/>`<br>  `</restriction>`<br>`</simpleType>` |
| SNVT_sound_db | SNVT_sound_db describes sound level using decibels. The type of SNVT_sound_db is snvt:sound_dbType.<br>Sound Level<br>SNVT Index    Measurement    Type Category    Type Size<br>33    Sound Level    Signed Long    2 bytes<br>Valid Type Range    Type Resolution    Units    Invalid Value<br>−327.68 . . . 327.67    0.01    Decibels (dB)<br>Raw Range    Scale Factors    File Name    Default Value<br>−32768 . . . 32767    1, −2, 0    N/A    N/A<br>(0x8000 . . . 0x7FFF)    $S = a * 10^b * (R + c)$<br>According to the definition, we design snvt:sound_dbType.<br>`<simpleType name="sound_dbType">`<br>  `<restriction base="float">`<br>    `<minInclusive value="−327.68"/>` |

TABLE 9-continued

| Name | Definition |
|---|---|
| | `<maxInclusive value="327.67"/>`<br>`<fractionDigits value="2"/>`<br>`</restriction>`<br>`</simpleTgpe>` |
| SNVT_time_sec | SNVT_time_sece describes time with second. The type of SNVT_time_sec is snvt:time_secType.<br>Elapsed Time |

| SNVT Index | Measurement | Type Category | Type Size |
|---|---|---|---|
| 102 | Elapsed time | Signed Long | 2 bytes |
| Valid Type Range | Type Resolution | Units | Invalid Value |
| 0 . . . 6553.4 | 0.1 | Seconds | 65,535 (0xFFFF) |
| Raw Range | Scale Factors | File Name | Default Value |
| 0 . . . 65,534<br>(0 . . . 0xFFFE) | 1, −1, 0<br>$S = a * 10^b * (R + c)$ | N/A | N/A |

According to the definition, we design snvt:time_secType.
```
<simpleType name="time_secType">
   <restriction base="float">
      <minInclusive value="0"/>
      <maxInclusive value="6553.4"/>
      <fractionDigits value="1"/>
   </restriction>
</simpleType>
```

| Name | Definition |
|---|---|
| SNVT_temp_p | SNVT_temp_p describes temperature with degree Celsius. The type of SNVT_temp_p is snvt:temp_pType.<br>Temperature<br>To be used for heating, ventilation, and air-conditioning (HVAC) applications. |

| SNVT Index | Measurement | Type Category | Type Size |
|---|---|---|---|
| 105 | Temperature | Signed Long | 2 bytes |
| Valid Type Range | Type Resolution | Units | Invalid Value |
| −273.17 . . . 327.66 | 0.01 | Degrees Celsius | 32,767 (0x7FFF) |
| Raw Range | Scale Factors | File Name | Default Value |
| −27,317 . . . 32,767<br>(0x954B . . . 0x7FFE) | 1, −2, 0<br>$S = a * 10^b * (R + c)$ | N/A | N/A |

According to the definition, we design snvt:temp_pType.
```
<simpleType name="temp_pType">
   <restriction base="decimal">
      <minInclusive value="−273.17"/>
      <maxInclusive value="327.66"/>
      <fractionDigits value="2"/>
   </restriction>
</simpleType>
```

| Name | Definition |
|---|---|
| SNVT_rpm | SNVT_rpm describes angular velocity with rotation per minutes. The type of SNVT_rpm is snvt:rpm_Type.<br>Angular Velocity |

| SNVT Index | Measurement | Type Category | Type Size |
|---|---|---|---|
| 102 | Angular Velocity | Unsigned Long | 2 bytes |
| Valid Type Range | Type Resolution | Units | Invalid Value |
| 0 . . . 63,534 | 1 | Revolutions per Minute (RPM) | 65,333 (0xFFFF) |
| Raw Range | Scale Factors | File Name | Default Value |
| 0 . . . 65,534<br>(0 . . . 0xFFFF) | 1, 0, 0<br>$S = a * 10^b * (R + c)$ | N/A | N/A |

According to the definition, we design snvt:rpm_Type.
```
<simpleType name="rpm_Type">
   <restriction base="unsignedInt">
      <minInclusive value="0"/>
      <maxInclusive value="65534"/>
   </restriction>
</simpleType>
```

As described above, the user sensory preference metadata according to the present embodiment is a simple and flexible framework for the RoSE engine.

The schemas of the user sensory preference metadata according to the present invention, which are divided into three levels: the personal preference information, the preference description information, and the effect preference information, are proper to describe preference information according to various user situations for sensory effects in single metadata. As described above, the user sensory preference metadata according to the present invention can properly describe user preference information.

The present application contains a subject matter related to U.S. Patent Application No. 61/081,361, filed in the United States Patent and Trademark Office on Jul. 16, 2008, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

What is claimed is:

1. A method for providing user preference information comprising:

receiving, by a sensory media generator, preference information for sensory effects from a user; and generating, by the sensory media generator, user sensory preference metadata including the received preference information;

transmitting, by the sensory media generator, the user sensory preference metadata including maximums and minimums for each effect to an apparatus for representing the sensory effects;

transforming, by the apparatus for representing the sensory effects, sensory effect metadata into sensory device command metadata using the user sensory preference metadata and sensory device capability metadata by analyzing the maximums and minimums for each effect regarding device capability maximums and minimums;

receiving, by a sensory device, sensory device command metadata from the apparatus for representing the sensory effects; and realizing the sensory effects using the sensory device command metadata, wherein the user sensory preference metadata includes personal preference information that describes the preference information, wherein the sensory effects include visual sense, auditory sense, olfactory sense, and tactile senses.

2. The method of claim 1, wherein the personal preference information includes personal information for identifying a plurality of users and preference description information for describing sensory effect preference information of each user.

3. The method of claim 2, wherein the preference description information includes effect preference information that includes detailed parameters for at least one sensory effect.

4. A method for representing sensory effects, comprising:
receiving, by an apparatus for representing the sensory effects, sensory effect metadata including sensory effect information about sensory effects applied to media;

obtaining, by an apparatus for representing the sensory effects, the sensory effect information by analyzing the sensory effect metadata;

receiving, by an apparatus for representing the sensory effects, user sensory preference metadata including preference information about sensory effects; and generating, by an apparatus for representing the sensory effects, sensory device command metadata for controlling sensory devices corresponding to the sensory effect information by referring to the preference information included in the user sensory preference metadata by transforming sensory effect metadata into sensory device command metadata using the user sensory preference metadata and sensory device capability metadata by analyzing maximums and minimums for each effect regarding device capability maximums and minimums, wherein the user sensory preference metadata includes personal preference information that describes the preference information, wherein the sensory effects include visual sense, auditory sense, olfactory sense, and tactile sense.

5. The method of claim 4, wherein the personal preference information includes personal information for identifying a plurality of users and preference description information for describing sensory effect preference information of each user.

6. The method of claim 5, wherein the preference description information includes effect preference information having detailed parameters for at least one of the sensory effects.

7. An apparatus for representing sensory effects comprising:
an input device configured to receive sensory effect metadata including sensory effect information about sensory effects applied to media and user sensory preference metadata including preference information of a user about sensory effects; and a controlling device configured to obtain the sensory effect information by analyzing the sensory effect metadata and generating sensory device command metadata for controlling sensory devices corresponding to the sensory effect information by referring to the preference information included in the user sensory preference metadata by transforming sensory effect metadata into sensory device command metadata using the user sensory preference metadata and sensory device capability metadata by analyzing maximums and minimums for each effect regarding device capability maximums and minimums, wherein the user sensory preference metadata includes personal preference information that describes the preference information, wherein the sensory effects include visual sense, auditory sense, olfactory sense, and tactile sense.

8. The apparatus of claim 7, wherein the personal preference information includes personal information for identifying a plurality of users and preference description information for describing sensory effect preference information of each user.

9. The apparatus of claim 8, wherein the preference description information includes effect preference information including detailed parameters for at least one of the sensory effects.

* * * * *